Sept. 3, 1957 O. W. KROMER Re. 24,353

SPRAY NOZZLE

Original Filed June 15, 1953

INVENTOR.
Orlando W. Kromer
BY
Merchant & Merchant
ATTORNEYS

United States Patent Office

Re. 24,353
Reissued Sept. 3, 1957

24,353

SPRAY NOZZLE

Orlando W. Kromer, Minneapolis, Minn.

Original No. 2,714,531, dated August 2, 1955, Serial No. 361,643, June 15, 1953. Application for reissue October 20, 1955, Serial No. 541,873

13 Claims. (Cl. 299—121)

Matter enclosed in heavy brackets [ ] appears in the original patent but forms no part of this reissue specification; matter printed in italics indicates the additions made by reissue.

My invention relates to spraying nozzles and has for its primary objective the provision of a nozzle which will throw a substantially uniform spray in a fan shape pattern of fixed and unprecedented width.

A still further object of my invention is the provision of a spray nozzle which is more efficient than any single spray nozzle or combination of spray nozzles heretofore produced, which cannot get out of adjustment, and which, by virtue of its having a single large opening, cannot become clogged.

A still further object of my invention is the provision of a device of the class above described which is extremely light in weight, which has a minimum of parts, and which is extremely inexpensive to produce.

A still further object of my invention is the provision of a spray nozzle which is rugged in construction and which will maintain its accuracy for a longer period of time.

The above and still further objects of my invention will become apparent from the following detailed specification, appended claims, and attached drawings.

Referring to the drawings, wherein like characters indicate like parts throughout the several views.

Figure 3:
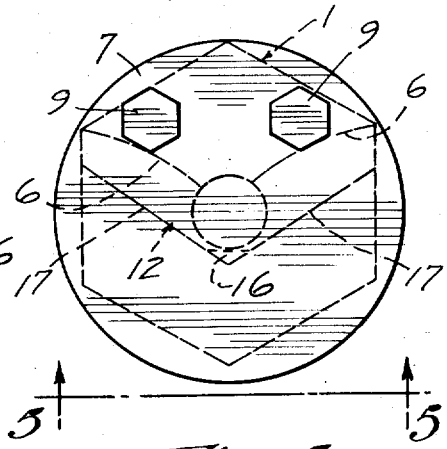
Fig. 3 is a view in rear elevation on the same scale as Fig. 2.
Figure 4:
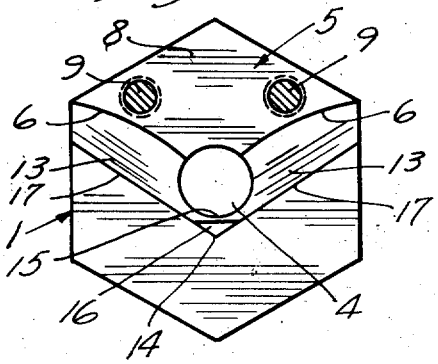
Fig. 4 is a view partly in section and partly in end elevation as seen from the line 4—4 of Fig. 2.

Referring with greater particularity to the drawings, the numeral 1 indicates in its entirely a main body or head having therein an axial bore 2, to the rear end portion of which a fluid conduit or pipe 3 is adapted to be received. The reduced forward end 4 of the bore 2 provides a forwardly opening jet-producing outlet. Body 1, as shown, is preferably formed from brass, cast iron, or steel bar stock, and has a forwardly extended neck 5 at its upper portion. As shown particularly by Figs. 3 and 4, the neck 5 extends radially outwardly from the bore opening 4 and is of less than 180 degrees in circumferential extent. For a purpose which will hereinafter become apparent, the neck 5 has arcuate converging undersurfaces 6 which intersect the upper end portion of the bore 4 on opposite sides of and in spaced relation to a line drawn vertically therethrough.

A circular spreader or impact plate 7 is detachably secured to the forward surface 8 of the neck 5 by means of headed bolts 9, and is generally concentrically disposed with respect to the bore 4. The spreader surface 10 of the spreader plate 7 is smooth and preferably polished. Furthermore, this surface 10 is at right angles to the axis of the bore 4 whereby to produce a downwardly and laterally outwardly opening spray passage 11, the upper extent of which is defined by the arcuate undersurfaces 6 of the neck

5, and hence said passage 11 has a circumferential extent greater than 180 degrees but less than 360 degrees.

In order that a spray of uniform density from end to end may be created, I provide a lip 12 which projects forwardly from the body 1 into the spray passage 11. As shown, the lip 12 has a surface 13 which slopes forwardly and downwardly from the undersurfaces 6 of the neck 5 toward the spreader plate 7. In practice, I have found that most efficient results are achieved by sloping of the surface 13 at a range of angles from between 10 and 16 degrees, specifically at 13 degrees with respect to the plane of the adjacent surface 10 of the spreader plate 7. As shown, the bore 4 opens through the surface 13, the surface 13 terminating in a point 14 below the bore 4 and in closely spaced relation to the spreader plate 7. The entire area of the surface 13 above the bottom 15 of the bore 4 is in the same plane. However, the pointed lower end portion of said lip 12 below the bore 4 is substantially parallel to the surface 10 of the spreader plate 7, as indicated at 16. Note also that the undersurfaces 17 of the lip 12 converge in straight lines defining a segment of less than 180 degrees.

Figure 1:
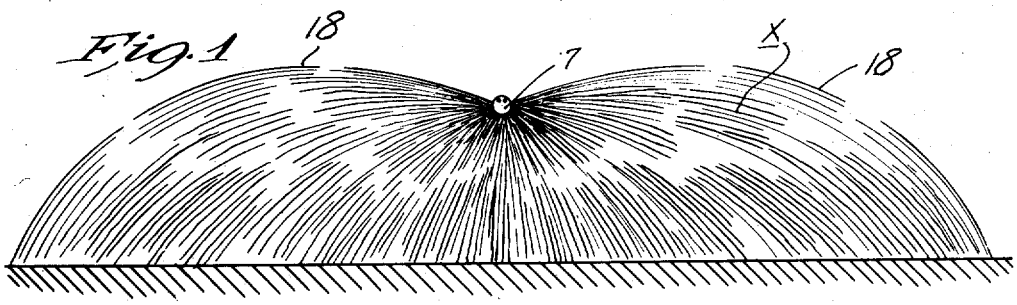
Fig. 1 is a view in rear elevation of my novel sprayer in use.
Figure 2:
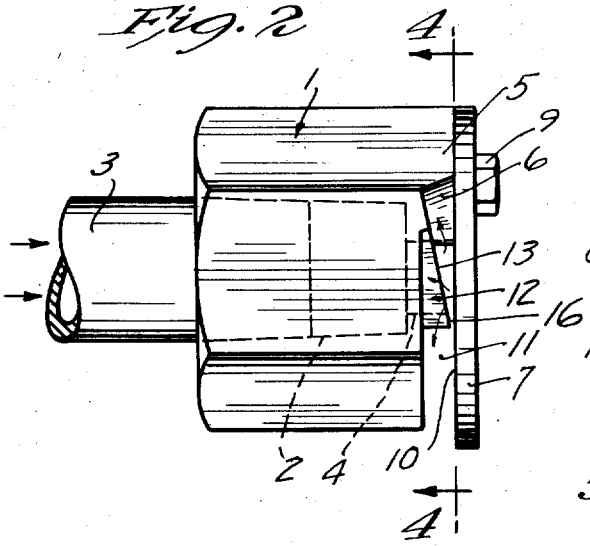
Fig. 2 is an enlarged view in side elevation.
Figure 5:
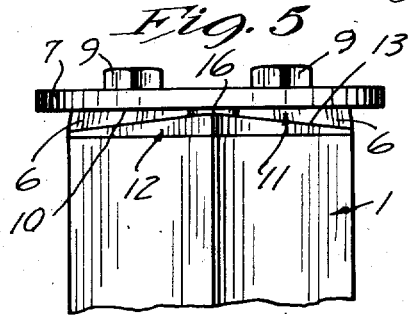
Fig. 5 is a fragmentary view in bottom elevation as seen from the line 5—5 of Fig. 3.

In operation, fluid under pressure entering the main body 1 through the pipe 3 is exited in a jet through the bore 4. This jet of fluid is forced against the smooth surface 10 of the impact or spreader plate 7 with considerable force. The fluid tends to be spread uniformly in all directions. However, the neck 5 and particularly the arcuate undersurfaces 6 create the upper limits of the fan-shape spray pattern X, illustrated in Fig. 1. Note particularly, by reference to Figs. 2 and 5, that the upwardly and rearwardly sloping surface 13 of the lip 12 creates a space between the lip 12 and the surface 10 of the spreader plate 7 which increases in width progressively from the parallel surface 16 thereof to the undersurfaces 6 of the neck 5. By this means, the least amount of the spray-producing fluid, entering the head 1 from the conduit 3, is allowed to pass between the closely spaced substantially parallel surfaces 10 and 16 to the area of the ground immediately therebelow; and an increasingly greater amount of fluid is utilized as the lateral distance from the head 1 increases on opposite sides. Note that the outermost limits of the spray X, identified by the numeral 18 in Fig. 1, is formed by the widest area between the surfaces 10 and 13, namely the juncture of the surface 13 with the undersurface 6. Note also, as shown in Fig. 2, that the arcuate undersurfaces 6 likewise extend angularly upwardly in the direction of the spreader plate 7 for increased efficiency.

My invention has been thoroughly tested and found to be completely satisfactory for the accomplishment of the above objects, and while I have disclosed a preferred embodiment thereof, I wish it to be understood that same is capable of modification without departure from the scope of the appended claims.

What I claim is:

1. A spray nozzle comprising a main body having a longitudinally extended jet producing bore therethrough, a spreader plate carried by one end of said body, spacer means overlying said bore spacing said spreader plate from said one end of said body and substantially normal to said bore, said spacer means being of less than 180 degrees in circumferential extent and having converging undersurfaces which intersect said bore; said body, spacer means and spreader plate defining an outwardly opening passage of more than 180 degrees of circumferential extent underlying said bore, a lip on said body intermediate said spreader plate and said one end of the body, said lip having a flat forward surface sloping outwardly from the spacer means toward the spreader plate and terminating below the bore in closely spaced relation to said spreader plate, with said bore opening through said lip.

2. The structure defined in claim 1 in which the spreader plate is provided with a smooth flat surface and in which said lip underlying said bore is provided with a flat surface portion which is substantially parallel to the smooth surface of said spreader plate.

3. The structure defined in claim 1 in which the forward surface of said lip lies at an angle of from 10 to 16 degrees from the adjacent surface of the spreader plate.

4. The structure defined in claim 1 in which the undersurfaces of said spacer means are arcuate and intersect said bore on opposite sides and in spaced relation to the vertical diameter of the bore.

5. The structure defined in claim 4 in which the spreader plate is provided with a smooth flat surface and in which said lip underlying said bore is provided with a flat surface portion which is substantially parallel to the smooth surface of said spreader plate.

6. The structure defined in claim 5 in which said lip is provided with undersurfaces which converge in straight lines defining a segment of less than 180 degrees.

7. A spray nozzle comprising a main body having a longitudinally extended jet-producing bore therethrough, a spreader plate carried by one end of said body at right angles to said bore, a spacer means axially spacing said spreader plate from the main body, said spacer means having spray pattern limiting surfaces intersecting said bore; said body, spacer means and spreader plate defining a radially outwardly opening segmental spray passage, a lip defined by said body, said lip being disposed within said spray passage and extending from said bore generally radially outwardly, said lip having a flat forward surface which slopes axially toward the spreader plate and terminates at its lower end portion adjacent the bore in closely spaced relation to said spreader plate.

8. A spray nozzle comprising a main body element having a longitudinally extended jet-producing bore therethrough, a detachable spreader plate element carried by said body element at right angles to said bore, a spacer means overlying said bore spacing said spreader plate element axially from said body element, said spacer means being of less than one-half of the peripheral extent of said body element and having converging undersurfaces which intersect the projected cross-sectional area of said bore; said body element, spacer means and spreader plate element defining an outwardly opening spray passage of more than 180 degrees in circumferential extent underlying said bore, a lip on one of said elements, said lip having a flat surface sloping from the spacer means toward the other of said elements and terminating below the bore in closely spaced relation to the other of said elements.

9. The structure defined in claim 8 in which one of said elements is provided with a smooth flat surface and in which the surface of said lip facing said flat surface lies at an angle of from 10 degrees to 16 degrees with respect thereto.

10. The structure defined in claim 8 in which one of said elements is provided with a smooth flat surface and in which said lip underlying said bore is provided with an angular surface portion which is substantially parallel to the smooth surface of the other of said elements.

11. The structure defined in claim 10 in which said lip is provided with undersurfaces which converge to define a segment of less than 180 degrees.

12. A spray nozzle comprising a main body element having a longitudinally extended jet producing bore therethrough, a spreader plate element carried by said body element, spacer means overlying said bore spacing said spreader plate element axially from said body element in intersecting relation to a projection of said bore, said spacer means having converging undersurfaces which intersect a projection of said bore; said body element, spacer means and spreader plate element defining a segmental spray passage, a lip on one of said elements, said lip having a flat surface extending from the spacer means axially toward the other of said elements and terminating beyond a projection of said bore in closely spaced relation to the other of said elements.

*13. A spray nozzle comprising a main body element having a longitudinally extended jet-producing bore therethrough, a spreader element carried by said body element, spacer means overlying said bore spacing said spreader element axially from said body element in intersecting relation to a projection of said bore, said spacer means having undersurfaces which converge downwardly toward said bore, one of said elements having a flat surface which is normal to the axis of the bore, and the other of said elements having a flat surface which slopes from said spacer means toward said normal surface and terminates in closely spaced relation thereto below the bore, said spacer means being formed integrally with the body element, and said normal surface being on said spreader element.*

References Cited in the file of this patent or the original patent

UNITED STATES PATENTS

| | | |
|---|---|---|
| 949,520 | Choate | Feb. 15, 1910 |
| 978,835 | Bowers | Dec. 20, 1910 |
| 1,439,177 | Loepsinger | Dec. 19, 1922 |
| 1,639,162 | Brooks | Aug. 16, 1927 |
| 2,338,273 | Wilkins | Jan. 4, 1944 |

FOREIGN PATENTS

| | | |
|---|---|---|
| 843,528 | Germany | July 10, 1952 |